United States Patent [19]

Andersson

[11] 4,180,154
[45] Dec. 25, 1979

[54] DUAL INSIDE/OUTSIDE CONVEYORS WITH SEPARATE DRIVES

[75] Inventor: Claes-Göran Andersson, Göthenborg, Sweden

[73] Assignee: Wikings Mekaniska Verkstad AB, Göthenborg, Sweden

[21] Appl. No.: 893,380

[22] Filed: Apr. 4, 1978

[30] Foreign Application Priority Data

May 17, 1977 [SE] Sweden .................. 7705833

[51] Int. Cl.² .................. B65G 43/08
[52] U.S. Cl. .................. 198/466; 198/469; 198/482; 198/572; 198/606; 198/796
[58] Field of Search .................. 198/425, 459, 461, 476, 198/482, 606, 796, 801, 464, 469, 470, 570, 571, 572, 418, 465, 466, 467

[56] References Cited

U.S. PATENT DOCUMENTS

| | | | |
|---|---|---|---|
| 683,039 | 9/1901 | Hagen | 198/607 X |
| 2,772,005 | 11/1956 | Dubin et al. | 198/470 X |
| 3,072,095 | 1/1963 | Keessen et al. | 198/470 X |
| 3,268,055 | 8/1966 | Stein et al. | 198/572 X |

FOREIGN PATENT DOCUMENTS 2605775  8/1977  Fed. Rep. of Germany .......... 198/425

Primary Examiner—James L. Rowland
Attorney, Agent, or Firm—Sughrue, Rothwell, Mion, Zinn and Macpeak

[57] ABSTRACT

Two pairs of spaced conveyor chains 18, 19 and 20, 21 are disposed one inside the other, and traverse identical rectangular runs between an infeed station 28 and an outfeed station 58. Each pair carries a respective serial array of pickup devices 22-23 and 33-41 arranged in two oppositely spaced groups for accommodating rolls of paper towels or the like. The conveyor chain pairs are independently driven by separate motors 6, 7 in such a manner that while one group of pickup devices is being intermittently stepped or indexed through the infeed station for loading, the other, previously loaded group is continuously advanced to the outfeed station for unloading and thereafter back to the vacated infeed station.

4 Claims, 3 Drawing Figures

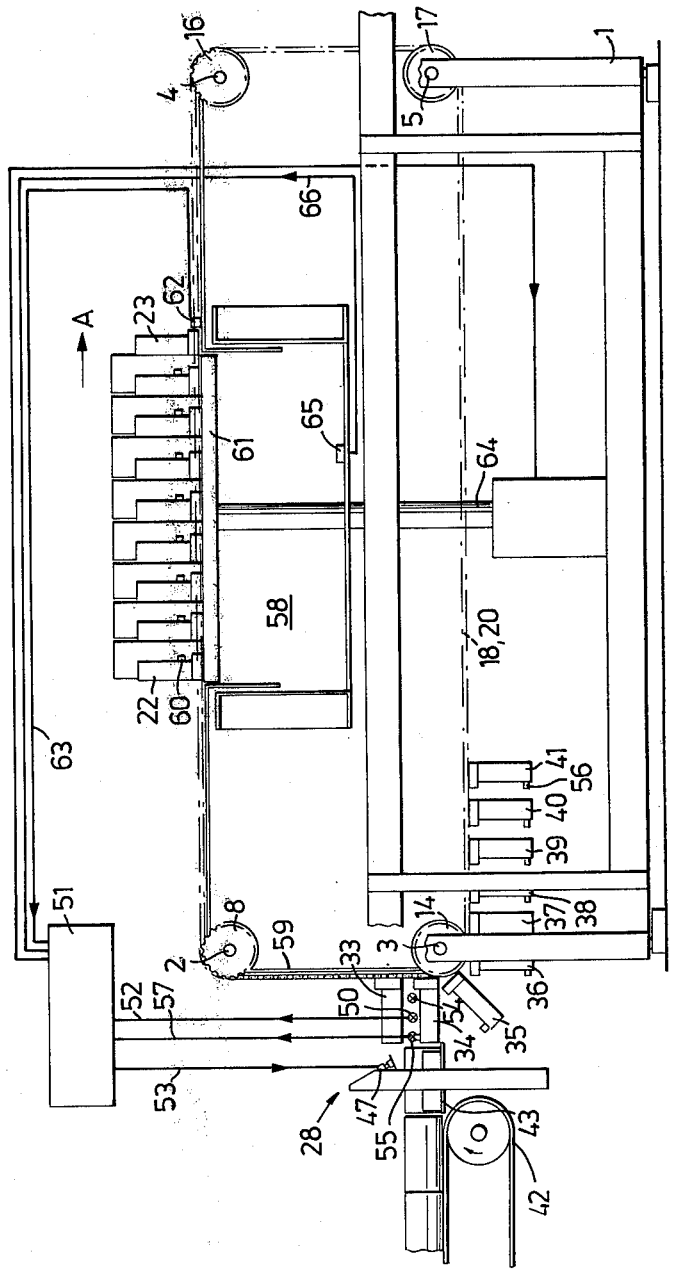

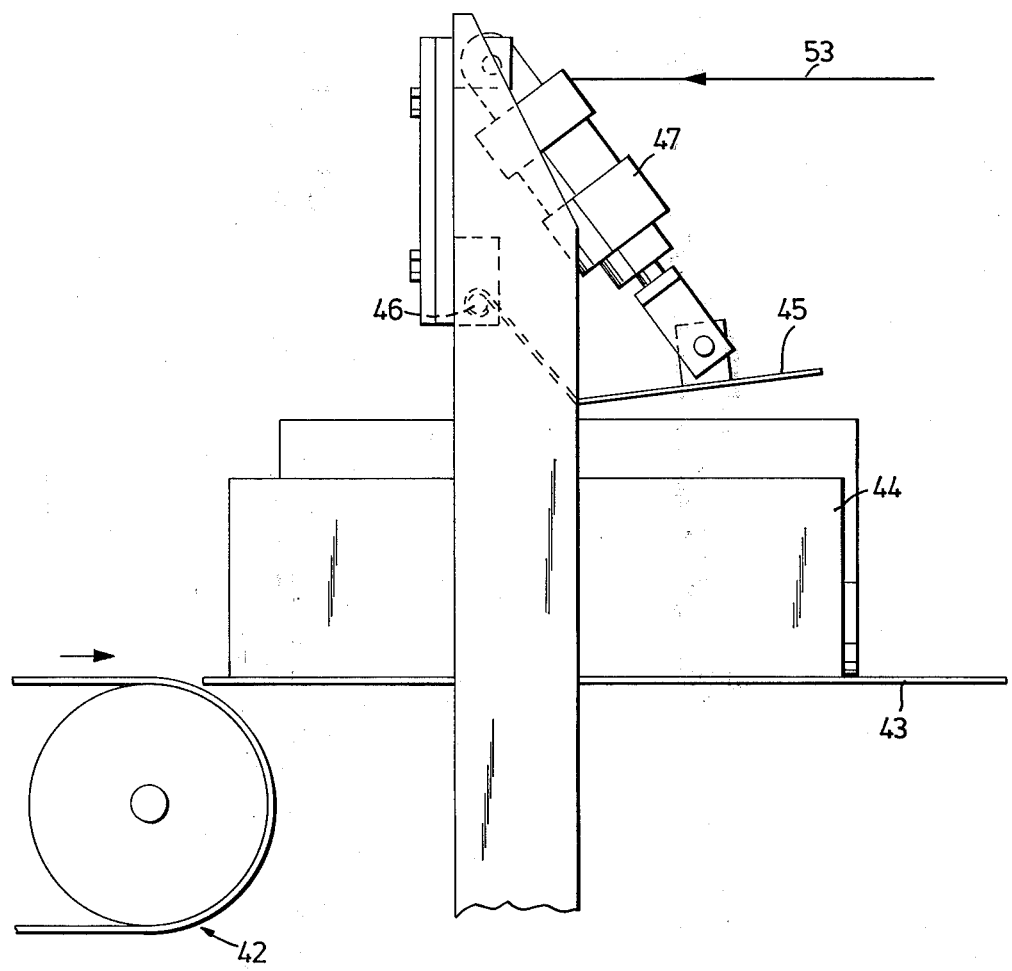

DUAL INSIDE/OUTSIDE CONVEYORS WITH SEPARATE DRIVES

BACKGROUND OF THE INVENTION

The present invention relates to a conveying device for conveying a group of objects from at least one infeed station to an outfeed station.

In known machines objects arranged in groups, such as rolls of kitchen paper, are conveyed from an infeed station to an outfeed station by means of a single endless conveyor which is moved stepwise to pick-up separate objects and, subsequent to forming a group, to transfer this group to the outfeed station. The conveyance of these objects is thus relatively slow and it is the main object of the invention to provide a conveying device which operates more quickly than those devices known hitherto.

SUMMARY OF THE INVENTION

This object is realized mainly by the fact that the conveying device comprises two endless conveyors each of which carries at least one array of pick-up devices, each of said pick-up devices being arranged to be moved to said infeed station by its associated conveyor and there to pick-up at least one object for conveying said object, and other objects picked-up by adjacently lying pick-up devices, in a group to the outfeed station, said pick-up devices on the two conveyors being moved thereby in one and the same movement path.

Because the pick-up devices are arranged on two conveyors and moved in one and the same movement path, objects can be fed in to one of said conveyors, which moves stepwise, at the same time as a group of pick-up devices of the other conveyor in one single movement and subsequent to discharging a group of objects, the now empty pick-up devices can be moved in one continuous movement back to the infeed station, from which a filled group of pick-up devices can now be moved to the outfeed station.

BRIEF DESCRIPTION OF THE DRAWING

The invention will now be described in more detail with reference to the accompanying drawings, in which FIG. 2 is a side view of the machine shown in FIG. 1, and FIG. 3 illustrates a holding device arranged at the infeed station.

FIGS. 1 and 2 illustrate a simplified version of a machine having a conveying device according to the invention.

BRIEF DESCRIPTION OF THE PREFERRED EMBODIMENTS

Figure 1:
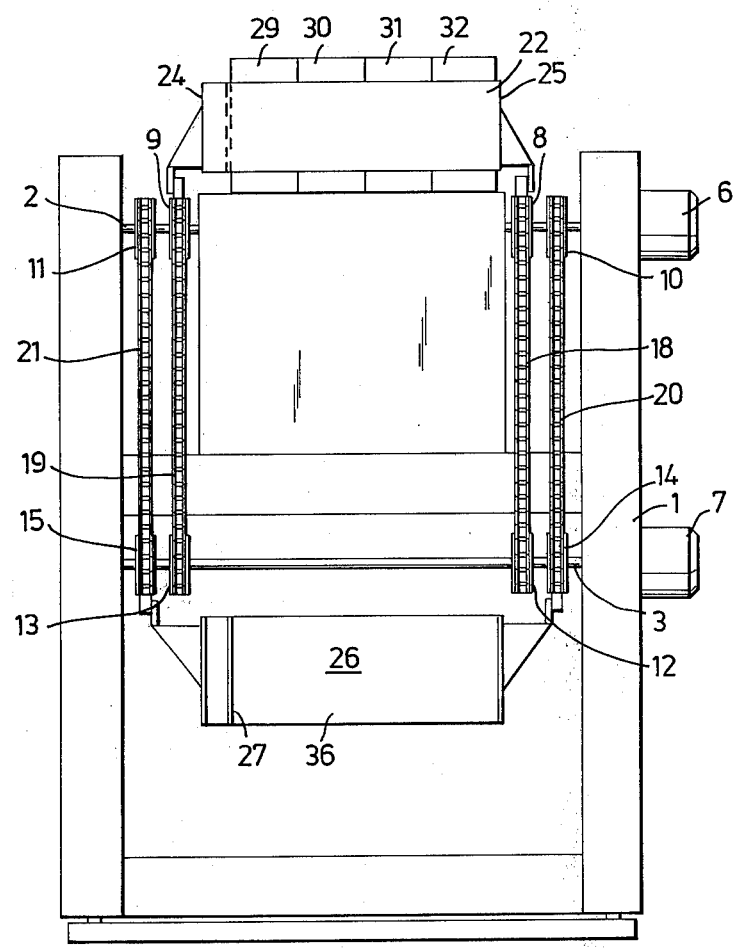
FIG. 1 illustrates a machine having a conveying device according to the invention, seen from the infeed end of the machine.

The machine comprises a frame structure 1 in which four shafts 2, 3, 4 and 5 are journalled. The shaft 2 is driven by a motor 6 and the shaft 3 by a motor 7. The shaft 2 has mounted thereon two fixed sprocket wheels 8 and 9 and two freely rotatable sprocket wheels 10 and 11. Thus, when the motor 6 drives the shaft 2, the sprocket wheels 8 and 9 will rotate together with said shaft whilst the sprocket wheels 10 and 11 will not be activated. The shaft 3, which is driven by the motor 7, has mounted thereon two freely rotatable sprocket wheels 12 and 13 and two fixed sprocket wheels 14 and 15. When the shaft 3 is driven by the motor 7, which may be an electric motor, the sprocket wheels 14 and 15 will rotate together with the shaft 3 whilst the sprocket wheels 12 and 11 will not be activated by the rotation of said shaft.

The rear shafts 4 and 5 carry freely rotatable sprocket wheels in positions corresponding to the aforedescribed sprocket wheels, FIG. 2 showing the sprocket wheels 16 and 17. It will be noted that in FIG. 2 there are illustrated the sprocket wheels 8 and 14 and not, as would be more correct, the sprocket wheels 10 and 14. The reason for this will be apparent hereinafter. Extending over the sprocket wheels 8 and 12 and corresponding, freely rotatable sprocket wheels on the shaft 4 and 5, is a drive chain 18. Similarly a drive chain 19 extends over the sprocket wheels 9 and 13 and corresponding freely rotatable sprocket wheels on the shaft 4 and 5, whilst a drive chain 20 extends over the sprocket wheels 10 and 14 and corresponding sprocket wheels on the shaft 4 and 5, and a drive chain 21 extends over the sprocket wheels 11 and 15 and corresponding freely rotatable sprocket wheels on the shafts 4 and 5, which drive chains are endless chains, as will best be seen from FIG. 2.

Mounted between the chains 18 and 19 are pick-up devices or dogs, for example dogs 22 and 23. Each pick-up device or dog comprises a plate bent to U-shape having two side walls 24 and 25 and a support wall 26 joining said side walls. A movable side wall 27 is arranged on each of the illustrated pick-up devices so that an adjustment can can be made in respect of the width of the objects to be picked-up at the infeed station 28. In the illustrated embodiment there is provided a group of nine pick-up devices between the chains 18 and 19 of which the one in the conveying direction (the arrow A in FIG. 2) is not utilized. Thus, eight objects can be conveyed between the closely arranged pick-up devices, the support walls of which devices lie at a distance from each other corresponding to the width of the object in the conveying direction. In the illustrated case, the conveying device is arranged to pick-up four rolls of kitchen paper 29, 30, 31 and 32 (see FIG. 1) in each pick-up device, these four rolls being hereinafter considered to form a single object.

Arranged between the chains 20 and 21 is a second group of pick-up devices, these devices being of the same type as those aforedescribed. These pick-up devices are identified by the references 33, 34, 35, 36, 37 38, 39, 40 and 41. The first pick-up device 33 does not pick-up an object but instead forms a support wall for a following object. In the illustrated embodiment each pair of chains 18, 19 and 20, 21 only carries one group of pick-up devices and the two groups are separated through approximately 180° in the movement path. Connected to the conveying device is a belt conveyor 42 or the like which continuously feeds rolls laying thereupon to an infeed table 43. The infeed table 43 lies in the same horizontal plane as the pick-up device which has been stepped forward to a position for receiving an object, i.e. in the illustrated case four rolls of kitchen paper lying side by side on the infeed table 43. The rolls are prevented from sliding laterally by means of side walls upstanding from the table, e.g. the side walls 44 in FIG. 3. In order to prevent an object from being advanced over the table 43 to a pick-up device when the said device is not in a position to receive said object, there is provided a holder 45 in the form of a pressure plate whose one end edge is journalled on a pivot axis 46 on the frame. The holder 45 is shown in FIG. 3 in its open position and the object on the infeed table 43 can thus be advanced to the pick-up device 34 in FIG. 2. The holder 45 is moved between its open and closed positions by means of an electromagnet, a pneumatic cylinder or the like 47, as hereinafter described. The objects on the belt conveyor 42 are moved onto the infeed table by the force exerted onto said objects travelling therebehind on said conveyor. It will be noted that in FIG. 1 there is only shown the first upstanding pick-up device 36. It will also be noted that the pick-up devices are connected to an associated chain at two or more locations in the longitudinal direction of the chain in a manner such that each support wall constantly extends substantially perpendicularly to a respective chain, and that the part of respective chains passing the infeed station 28 shall therefore extend perpendicularly to the infeed table 43.

Since the holder 45 is in its open position, the object lying on the infeed table 43 in FIG. 3 will be pushed into the opposing pick-up device 34 by a following object. As soon as the object has been picked up by the device 34 a sensing device 50 is actuated, said sensing device being a photo-cell, switch or like element arranged to transmit a signal to a central operating apparatus 51 via a line 52. Upon receiving said signal, the central operating apparatus 51 transmits a blocking signal to the electromagnet 47 via a line 53, whereupon the holder 45 is lowered towards the object which pushed the first mentioned object into the pick-up devices 34 and holds the pushing object on the infeed table 43.

A further sensor 55, which may be a photo-cell, senses a tag 56 (see the pick-up device 41) and transmits a signal to the central operating apparatus 51 via a line 57. As a result of the positioning of the tag 56 the sensed pick-up device 34 is identified as belonging to the group of pick-up devices moved by the chains 20 and 21 and the combined signals from the sensor 50 and 55 instruct the central operating apparatus 51 to send an indexing signal to the motor 7. When the motor 7 receives the indexing signal, it drives the sprocket wheels 14 and 15, and therewith the chains 20 and 21, through one feed step, i.e. the next-following pick-up device 35 is moved into position to receive the object held on the table 43 by the holder 45. As soon as the pick-up device 35 has reached its pick-up position, its identifying tag, or some other form of marking, such as a colored marking on a side wall of the device, is sensed and a signal sent to the central operating apparatus 51 to the effect than an opening signal shall be sent to the electromagnet 47 such that the holder 45 is raised and the object on the infeed table pushed into the pick-up device 35. The aforedescribed sequence of events is repeated until all pick-up devices 34-41 have picked up an object, i.e. a total of eight objects have been transferred to said devices. The signals from the object sensors 50 are counted in the central operating apparatus 51 and when eight signals have been received by said apparatus a "proceed to the outfeed station" signal is sent to the motor, which then commences to drive the chains continuously so that the filled groups of pick-up devices 33-41 are conveyed continuously to the outfeed station. Since in the illustrated embodiment the pick-up devices are open towards the chains, there is provided between the chains a slide plate 59 on which the ends of all objects rest and slide.

Towards the outfeed station the conveyor path merges with a horizontal part, whereby the object being conveyed, in the illustrated case rolls of kitchen paper, will stand on their end surfaces close together and only separated by the thin side walls 26 of the pick-up devices.

During the described sequence of events, the pick-up devices, e.g. the devices 22 and 23 on the chain 18 and 19 have been continuously driven by the motor 6 from the infeed station 28 to the outfeed station 58. During the infeed sequence the pick-up devices on the chains 18 and 19 are identified by a photo-cell or some other sensor 54 arranged to sense a tag or similar marking which is positioned at a different position than the tag 56. Such a tag is shown at 60 on the pick-up device 22. When the group of pick-up devices on the chains 18, 19 have reached a table 61 and have been placed thereupon, a limit switch is activated, said limit switch transmitting a signal to the central operating apparatus 51 via a line 63. Upon receipt of the signal, the central operating apparatus 51 transmits a lowering signal to a hydraulic or pneumatic device provided with a piston-cylinder arrangement 64 which carries the table 61. The table 61 with the group of objects located thereupon is then lowered and the objects moved from the table, by means not shown, to a station at which they are supplied with labels or the like.

Subsequent to the table 61 reaching its lower position and the objects having been removed from the pick-up devices, a limit switch 65 is activated and transmits a signal to the central operating apparatus 51 via a line 66. The central operating apparatus 51 then transmits a movement signal to the motor 6 which then moves the newly emptied group of pick-up devices continuously to the infeed station. As soon as the second pick-up device in this group has reached the infeed position, its marking 60 is sensed by the sensor 54 and the drive motor 6 is stopped and the electromagnet 47 of the holder 45 receives an opening signal, whereafter the first object is pushed into the pick-up device in registry therewith. Simultaneously herewith, unloading of the objects from the group of pick-up devices on the chains 20 and 21 is commenced.

It will be understood from the aforegoing that the described conveying device permits individual groups of pick-up devices to be loaded and unloaded simultaneously and that conveyance of the objects is effected continuously despite that the pick-up devices are filled and unloaded in groups.

It is also possible to feed in the objects on two levels one above the other, one type of object being fed in on one level, for example, and another type of object being fed in on the other level. The functioning of the device in other respects is the same as that described above.

It is also possible to feed-in objects from both ends of the machine according to FIG. 2. In this case one conveyor 18, 19 will move clockwise whilst the other conveyor 20, 21 is moved counter-clockwise between respective infeed and outfeed stations in order for the pick-up devices not to collide with one another. The changes in the sensing system necessitated hereby will be clearly obvious to one skilled in the art and need not therefore be described.

Although the described conveying device comprises two endless chains for each of pick-up devices, it is possible to use only one chain for each such group. Thus, the chain 20 for the group of pick-up device 33-41 can be replaced by a guide for each edge portion of the pick-up devices, for example a roller arranged to run in a crack, said roller being placed in the centre of rotation of an associated pick-up device in a manner such that said device can be held perpendicularly to the remaining driving chain 21. It is also possible to replace chains by toothed belts or any other suitable element.

The described pick-up devices can be modified in dependence upon the form of the objects to be conveyed in groups, and may comprise tubes or cylinders open at both ends thereof.

I claim:

1. A conveying device for conveying groups of objects (29-32) from an infeed station (28) to an outfeed station (58) by means of two endless conveyors (18, 19; 20, 21), each of which carries at least one array of pick-up devices (33-41), characterized by: separate drive means (6, 7) arranged a) to individually move the two conveyors independently of one another in a direction from the infeed station to the outfeed station, b) to drive the respective conveyors stepwise to index the pick-up devices carried thereon through the infeed station for picking up at least one object during the dwell period between each movement step; and (c) to drive the respective conveyors in a continuous movement between the infeed station and the outfeed station, both of the conveyors traversing the same path during their respective moments.

2. A conveying device according to claim 1, wherein the two endless conveyors extend over wheels (8-15) arranged on shafts (2-5) which are common to both conveyors.

3. A conveying device according to claim 2, wherein each conveyor comprises at least one endless drive chain which extends over sprocket wheels.

4. A conveying device according to any one of claims 1-3, wherein each pick-up device comprises a support wall (26) held by an associated conveyor in a substantially horizontal position at the infeed station (28) and in a substantially vertical position at the outfeed station (58).